US010373176B1

(12) United States Patent
Wei et al.

(10) Patent No.: US 10,373,176 B1
(45) Date of Patent: *Aug. 6, 2019

(54) USE OF USER CONSUMPTION TIME TO RANK MEDIA SUGGESTIONS

(71) Applicant: Google LLC, Mountain View, CA (US)

(72) Inventors: Li Wei, San Jose, CA (US); James Vincent McFadden, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,285

(22) Filed: Oct. 30, 2017

Related U.S. Application Data

(63) Continuation of application No. 13/631,084, filed on Sep. 28, 2012, now Pat. No. 9,805,378.

(51) Int. Cl.
G06Q 30/02 (2012.01)
H04N 21/25 (2011.01)

(52) U.S. Cl.
CPC ........... *G06Q 30/02* (2013.01); *H04N 21/251* (2013.01)

(58) Field of Classification Search
CPC .............................. H04N 21/251; G06Q 30/02
USPC .......................................................... 725/14
See application file for complete search history.

(56) References Cited

U.S. PATENT DOCUMENTS

| 5,978,766 A * | 11/1999 | Luciw ................ G06Q 30/0201 705/7.29 |
| 6,637,029 B1 * | 10/2003 | Maissel ............. H04N 5/44543 348/E5.105 |
| 7,096,486 B1 * | 8/2006 | Ukai ................... H04N 5/44543 348/E5.105 |
| 7,937,725 B1 | 5/2011 | Schaffer et al. |
| 7,966,632 B1 | 6/2011 | Pan et al. |
| 8,001,567 B2 * | 8/2011 | Ozer .................. H04N 5/44543 386/297 |
| 8,260,117 B1 * | 9/2012 | Xu ..................... H04N 21/4668 386/239 |
| 8,793,729 B2 * | 7/2014 | Adimatyam ....... H04N 5/44543 725/40 |
| 8,959,540 B1 * | 2/2015 | Gargi .................. H04N 21/251 725/9 |
| 9,088,808 B1 * | 7/2015 | He ....................... H04N 21/251 |
| 2002/0129368 A1 * | 9/2002 | Schlack ................ G06Q 30/02 725/46 |
| 2003/0172134 A1 | 9/2003 | Zervas et al. |
| 2004/0044677 A1 * | 3/2004 | Huper-Graff .......... G06Q 30/02 |
| 2004/0111741 A1 * | 6/2004 | DePietro .................. H04N 5/50 725/34 |
| 2006/0026644 A1 * | 2/2006 | Yamagishi ............. H04H 60/39 725/46 |
| 2006/0041548 A1 * | 2/2006 | Parsons ................. G06F 16/954 |

(Continued)

*Primary Examiner* — Nathan J Flynn
*Assistant Examiner* — Tung T Trinh
(74) *Attorney, Agent, or Firm* — Lowenstein Sandler LLP

(57) ABSTRACT

A method includes presenting a list of one or more videos via a user interface, receiving a selection of a target video to watch from the list, playing the target video in the user interface, and updating the user interface to present one or more suggested videos concurrently with playback of the target video. The one or more suggested videos are predicted to be watched by a user for at least a threshold duration.

20 Claims, 7 Drawing Sheets

(56) References Cited

U.S. PATENT DOCUMENTS

| | | | |
|---|---|---|---|
| 2006/0059042 A1* | 3/2006 | Zohar | G06Q 30/02 705/14.46 |
| 2006/0075420 A1* | 4/2006 | Ludvig | H04H 60/32 725/9 |
| 2009/0006368 A1* | 1/2009 | Mei | H04N 7/17318 |
| 2010/0010890 A1* | 1/2010 | Ditkovski | G06Q 30/02 705/14.41 |
| 2010/0153411 A1* | 6/2010 | Toebes | G06F 16/9535 707/758 |
| 2010/0199295 A1 | 8/2010 | Katpelly et al. | |
| 2011/0054999 A1* | 3/2011 | Attenberg | G06Q 30/02 705/14.43 |
| 2011/0066674 A1* | 3/2011 | Piepenbrink | G06Q 30/02 709/203 |
| 2012/0222056 A1* | 8/2012 | Donoghue | H04N 5/44543 725/5 |
| 2012/0331494 A1* | 12/2012 | Pontual | H04N 21/44222 725/9 |
| 2013/0262365 A1* | 10/2013 | Dolbear | G06N 5/02 706/47 |

* cited by examiner

TV1 -> SV1

SV2 (watched 5 seconds)
    -> SV2.1
    -> SV2.2
    -> SV2.3

SV3 (watched 300 seconds)  -> SV3.1 (watched 60 seconds)  -> SV3.1.1
                                                                                                                                                                    -> SV3.1.2
                                                                                                                                                          -> SV3.1.3

-> SV3.2
                              -> SV3.3 (watched 90 seconds)  -> SV3.3.1 (watched 180 seconds)
                                                                                                                                                        -> SV3.3.2
                                                                                                                                                            -> SV3.3.3

Example Value 605    Features 607

0,  "TV1"
5,  "TV1", "SV2.1", 0, "SV2.2", 0, "SV2.3", 0
630, "TV1", "SV3.1", 60, "SV3.1.1", 0, "SV3.1.2", 0, "SV3.1.3", 0, "SV3.2", 0, "SV3.3", 90, "SV3.3.1", 180, "SV3.3.2", 0, "SV3.3.3", 0

Examples 603

USE OF USER CONSUMPTION TIME TO RANK MEDIA SUGGESTIONS

CROSS-REFERENCE TO RELATED APPLICATION

This Continuation Application claims priority to U.S. patent application Ser. No. 13/631,084, filed on Sep. 28, 2012, which is incorporated by reference in its entirety.

TECHNICAL FIELD

The present disclosure relates to media suggestions and, more particularly, to a technique of using user consumption time to rank media suggestions.

BACKGROUND

Users may watch videos using the Internet. The users may specify the video he or she intends to watch or a recommendation system may recommend videos for a user to watch. Some recommendation systems generate personalized video recommendations for each user using data that is associated with the particular user. For example, a recommendation system may provide video recommendations to a user based on the user's geographical location, gender, interests, age, etc. Some recommendation systems use a content-based approach that analyzes properties of videos that a user has selected in the past and then recommends videos with similar properties. For example, if a user has selected many videos that include dogs in the past, the user may be recommended to watch other videos classified as having dogs. However, this approach typically requires extensive history of a user's prior selection of videos.

Some recommendation systems also make recommendations based on a binary decision of whether a user has selected a video to watch or not. The recommendation systems do not treat videos that are selected and fully watched differently from videos that are selected and then watched for a short period of time. This approach may lead to video suggestions that are of little value to the user.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and system to rank and provide media item recommendations using the predicted time that users may spend consuming the media items. The method includes receiving a user request for a media item and identifying candidate media items to be suggested to the user with the media item. The method further includes predicting a user consumption time for each candidate media item, selecting a sub-set of the candidate media items that have higher predicted user consumption times, and providing the requested media item with the sub-set of the candidate media items.

BRIEF DESCRIPTION OF THE DRAWINGS

The present disclosure will be understood more fully from the detailed description given below and from the accompanying drawings of various implementations of the disclosure.

FIG. 5 illustrates an example of a tree diagram describing activity recorded in log data, in accordance with various implementations.

FIG. 6 illustrates an example of a training data, in accordance with various implementations.

DETAILED DESCRIPTION

Figure 1:
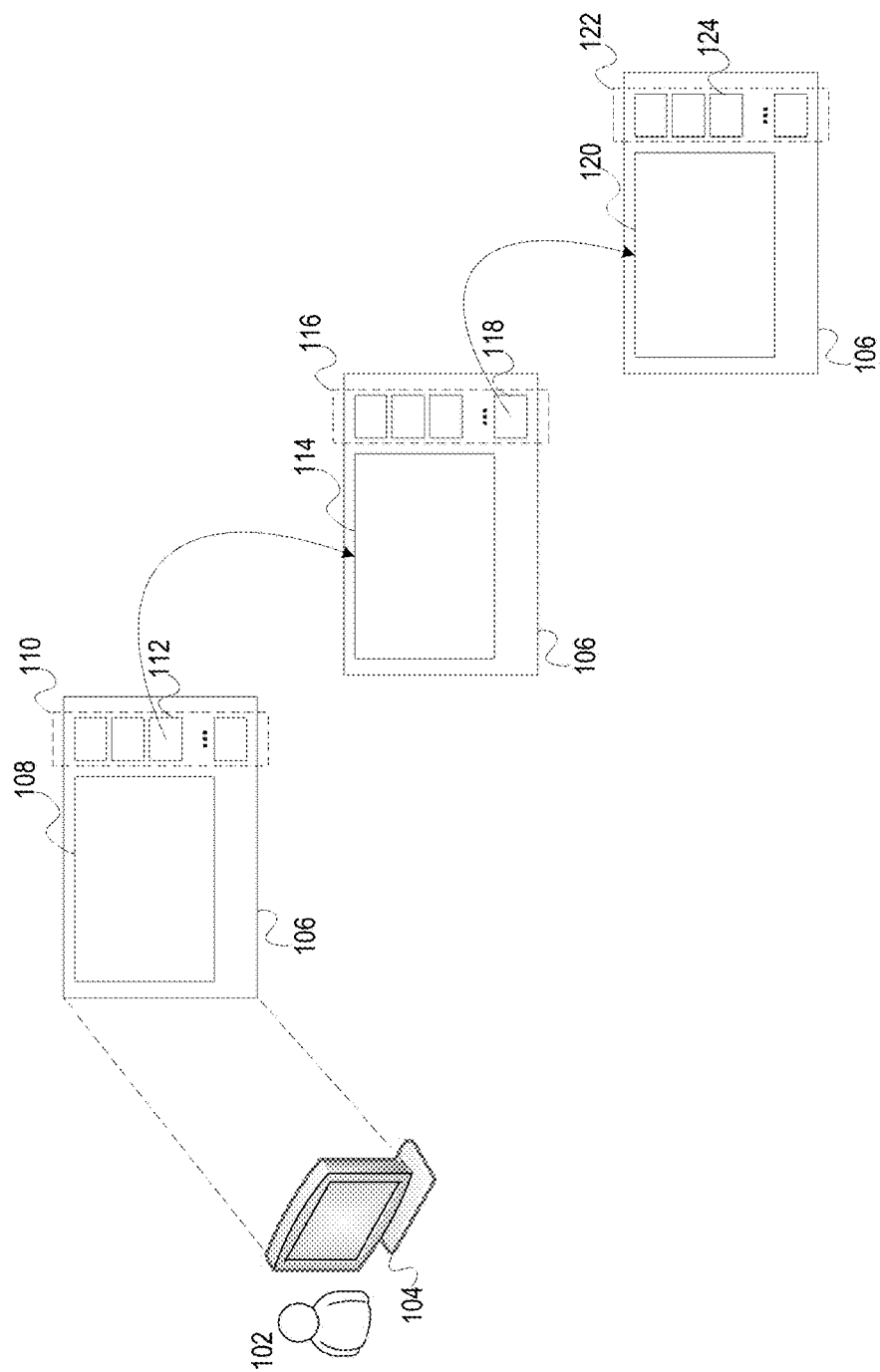
FIG. 1 illustrates a client device that can advantageously utilize various aspects in accordance with one or more implementations.

A system and method for ranking media items using media item user consumption time is described. User consumption time is the time one or more users spend consuming a media item, according to various implementations. Examples of media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. For brevity and simplicity, a video is used as an example of a media item throughout this document. Consuming a media item can include, for example, and is not limited to, watching a media item, listening to a media item, editing a media item, etc. For example, a user may watch a video, edit a photo, listen to music, read a blog, etc.

Implementations of the present disclosure can provide more accurate suggested media items to users by taking into account the user consumption time of the media items. For example, a user may watch a target video, which is a video that the user has requested to watch, in a graphical user interface (GUI) in a browser or a mobile application on a client device. For example, a user sees a list of videos in a webpage in the browser and selects one of the videos as the target video to watch. When a user selects a target video to watch, the system can present the target video to the user in the GUI and can also provide suggested videos, which the user may wish to watch, in the GUI. The suggested videos are selected from a number of candidate videos.

A data store can store any number of candidate media items (e.g., candidate videos). A candidate media item is a media item that may be selected as a suggested media item for a target media item, according to various implementations. When a user requests a target media item, the system can identify a set of candidate media items that correspond to the requested target media item. One implementation of identifying the candidate media items is described in greater detail below in conjunction with FIG. 2. For example, the data store may store hundreds of candidate videos. A user may select Video-A as the target video and a set of 100 candidate videos that correspond to Video-A may be identified.

A model can be created using a set of training data to predict user consumption time for each of the candidate media items that correspond to the target media item. One implementation of creating and training the model is described in greater detail below in conjunction with FIG. 2. A prediction model is a function that uses input data to make a prediction for an item, based on similar examples in the training data for the model, according to various implementations. At run time, the model can be executed to predict the user consumption time for each of the candidate media items that correspond to the target media item. For example, the model may predict that candidate video-1 has a predicted user consumption time of 42 seconds, candidate video-2 has a predicted user consumption time of 120 seconds, candidate video-3 has a predicted user consumption time of 6 seconds, etc. The predicted user consumption times can be used to rank the candidate media items and the top-ranking candidate media items may be selected as the suggested media items for the target media item.

FIG. 1 provides an illustration of providing suggested media items using user consumption time in accordance with various implementations. A user 102 can use an application, such as a web browser or a mobile application, on a client device 104 to consume digital media items. One implementation of client device functionality is described in greater detail below in conjunction with FIG. 3.

As used herein, "media," media item," "digital media," and a "digital media item" can include an electronic file that can be executed or loaded using software, firmware or hardware configured to present the digital media item to a user. A digital media item can include images and video that can be read by a user and/or audio that can be listened to by the user. Examples of digital media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A digital media item may include a single work or a collection of works. For example, a digital media item may include a video clip or an entire video. In another example, a digital media item may include a single song or an entire album. In another example, a digital media item may include a single book, or an anthology. Additionally, a single digital media item may include, for example, an audio portion (e.g., a music album) and a written word portion (e.g., an electronic publication).

For brevity and simplicity, a video is used as an example of digital media item. The web browser or mobile application can provide the user 102 with a graphical user interface (GUI) 106 that includes a target video 108 which the user 102 wishes to consume (e.g., watch). The GUI 106 can also include a set of suggested videos 110. The user 102 may select one of the suggested videos, such as suggested video 112. A new set of suggested videos may be determined and provided to the user 102 via the GUI 106 each time the user selects a suggested video. For example, the user 102 may select suggested video 112 and the GUI 106 can include the selected suggested video 112 as the new target video 114 and a new set of suggested videos 116. The user 102 may select suggested video 118 and the GUI 106 can include the selected suggested video 118 as the new target video 120 and another new set of suggested videos 122.

The sets of suggested media items (e.g., suggested videos 110, suggested videos 116, suggested videos 122) may be determined using the predicted user consumption time users may spend watching the various candidate media items. In some implementations, the predicted user consumption time users may spend watching the various candidate media items is determined using the sub-tree consumption time, which attributes user consumption time of child suggested media items to the parent suggested media item in addition to the user consumption time of the parent suggested media item. For example, the time (e.g., 1.5 minutes) spent watching child suggested video 124 and the time (e.g., 2.9 minutes) spent watching child suggested video 118 may be attributed to parent suggest video 112 in addition to the time (e.g., 5.5 minutes) spent watching parent suggested video 112. The sub-tree consumption time for parent suggested video 112 may be 9.9 minutes.

Figure 2:
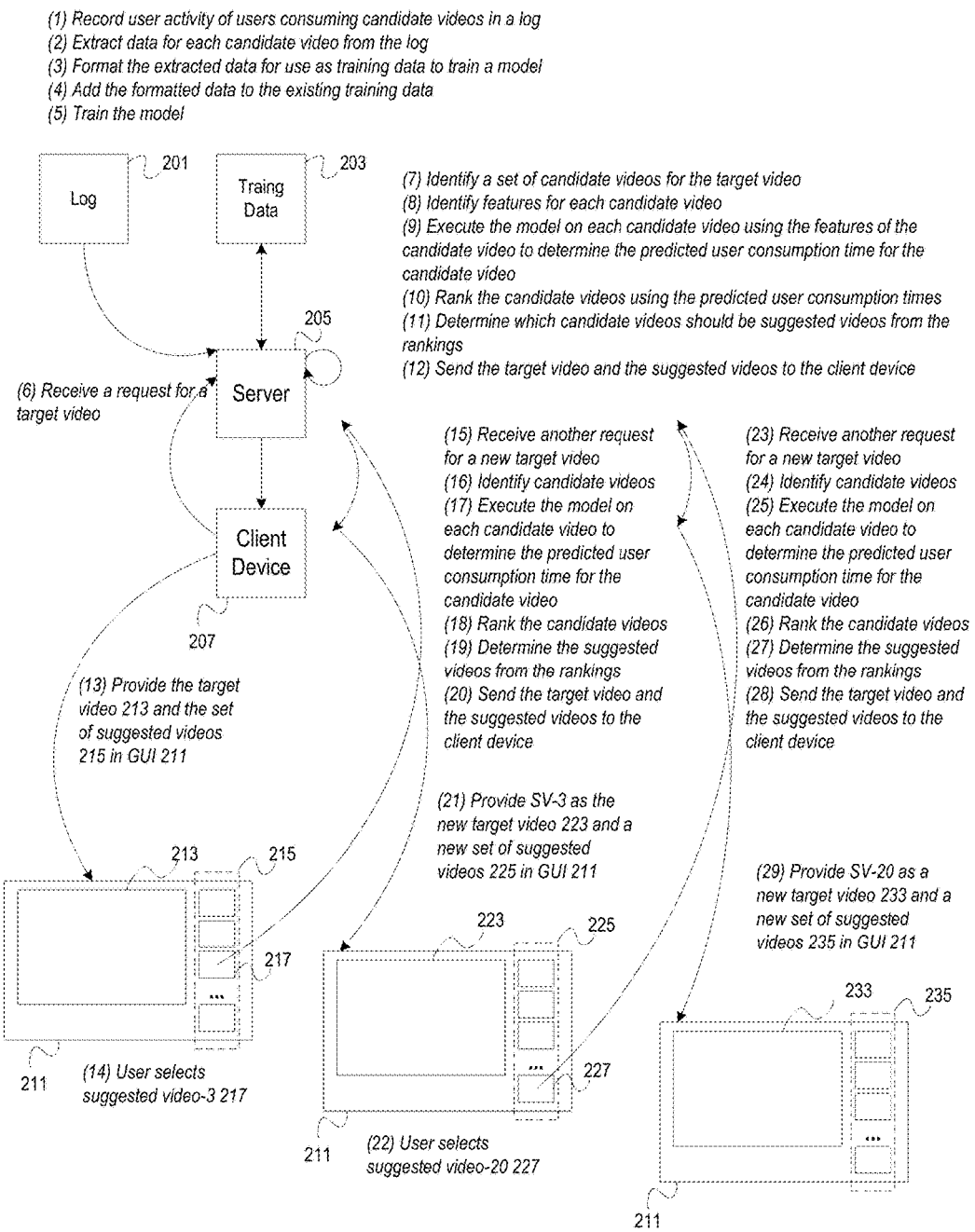
FIG. 2 illustrates an example of ranking media items using predicted user consumption time in accordance with various implementations.

FIG. 2 illustrates an example of ranking media items using user consumption time in accordance with various implementations. User activity of watching or otherwise consuming media items can be recorded in a log 201. For brevity and simplicity, a video is used as an example of a media item. One or more data stores can store logs 201 that record, for various videos, the user consumption time of any number of users consuming any number of videos. The user consumption time can be, for example, the time a user spends watching a video. For example, the log 201 may indicate that a user spent 6.8 minutes watching Video-1, 2.2 minutes watching Video-2, 4.5 minutes watching Video-3, etc. The log 201 can also record, for various videos, how much time users spend watching videos ("child" suggested videos) that were directly and indirectly suggested for a particular video ("parent" video). The log 201 can store data collected over a period of time. For example, the log 201 may reflect user activity for the last twenty-four hours. In one implementation, a client device notifies users of the types of information that are stored in the respective logs and data stores and transmitted to the server, and provides the user the opportunity to choose not to have such information collected and/or shared with the server.

At the end of the time period (e.g., twenty-four hours), a server 205 can extract data from the log 201 and format the extracted data for use as training data 203 to create or train a model. The training data 203 can be a representation of log data for an extended period of time. For example, the training data 203 may reflect data from logs 201 for the past thirty days.

For example, the server 205 may extract data from the log 201 to determine and attribute the total actual user consumption time a user spends watching a selected parent suggested video and the actual user consumption time the user spends watching child suggested videos to the parent suggested video to use as training data 203 to create or train the model. For example, the log 201 may record user activity of a user that may see an initial set of twenty suggested videos (e.g., SV1 to SV20) and may select one of the suggestions, such as suggested video-3 (SV3), to watch. A client device may present SV3 in a graphical user interface (GUI) and a second set of suggested videos, such as SV3.1 to SV3.20, for SV3 in the GUI. The user may see the second set of twenty suggested videos (e.g., SV3.1 to SV3.20) and may select one of the suggestions, such as suggested video-3-5 (SV3.5) to watch. The system can present SV3.5 in the GUI and a third set of suggested videos, such as SV3.5.1 to SV3.5.20, for SV3.5 in the GUI. The user may see the third set of twenty suggested videos (e.g., SV3.5.1 to SV3.5.20) and may select one of the suggestions, such as suggested video-3-5-12 (SV3.5.12) to watch.

The selected suggested video SV3 from the initial set of suggested videos may be considered the parent suggested video. The selected suggested video SV3.5 and the selected suggested video SV3.5.12 may be considered child suggested videos for the parent suggested video SV3. The user may have watched SV3 for four minutes, SV3.5 for one minute, and SV3.5.12 for two minutes. The system can attribute the total actual user consumption time the user spent watching SV3, SV3.5, and SV3.5.12 to the parent suggested video SV3. For example, the server 205 may attribute seven minutes to the suggested video SV3. The total actual user consumption time a user spends consuming (e.g., watching, listening, reading) a parent suggested media item (e.g., video, music, photos, etc.) and the actual user consumption time the user spends consuming child suggested media items is hereinafter referred to as "sub-tree consumption time," in accordance with various implementations. The server 205 can determine the actual user consumption times and/or the actual sub-tree consumption times from the extracted data from the log 201 and format the actual user consumption times and/or the actual sub-tree consumption times as training data 203 for training the model.

The model can be a prediction model, that when executed, can predict, for example, for each media item (e.g., video, song, etc.), the user consumption time, which is the amount of time users may spend consuming a media item, according to various implementations. The model can also predict the sub-tree consumption time for media items. One implementation of the model is described in greater detail below in conjunction with FIG. 4. The model can be a regression model, which is a model that predicts a numeric value for an item given the closeness of the item to the existing examples in the training data 203. For example, at run time, the model may predict that a user may spend 6.5 minutes watching video-1, 2.0 minutes watching video-2, 4.8 minutes watching video-3, etc.

A server 205 can receive a request for a target video from a client device 207. For example, a user may select a target video to watch using the client device 207. The client 207 can send the request, which identifies the target video, to the server 205. In response to the request, the server 205 can identify a set of candidate videos that correspond to the requested target video. The server 205 may identify the set of candidate videos or another system may identify the set of candidate videos and provide data identifying the set of candidate videos that correspond to the requested target video to the server 205.

The server 205 can also identify a set of features for each candidate video. The features are parameters of the candidate video and can be used as input data when the model is executed. Examples of features can include, and are not limited to, the identifier of the target video that is associated with the candidate video, the identifiers of the other suggested videos that are in the same set of suggestions as the candidate video, the user consumption time of the other suggested videos, a country identifier associated with the candidate video, a gender associated with a user watching the candidate video, an age associated with a user watching the candidate video, etc. The server 205 can request a user to optionally provide user information (e.g., age, gender, country, etc.), receive the user information, and store the user information in a data store. In one implementation, client device notifies users of the types of information that are stored in the respective logs and data stores and transmitted to the server, and provides the user the opportunity to choose not to have such information collected and/or shared with the server.

The server 205 can execute the prediction model on each candidate video using the features of the candidate video to determine the predicted time users may spend consuming the candidate videos. For example, there are a set of a hundred candidate videos that are associated with the requested target video. The server 205 runs the model on the hundred candidate videos, using the features of the 100 candidate videos, and determines hundred numbers, one for each candidate video predicting how much time the user may spend watching each of the hundred candidate video because of the target video. The time can be the user consumption time or the sub-tree consumption time.

The server 205 can sort the predicted user consumption times or the sub-tree consumption times to rank the candidate videos and determine which candidate videos, from the ranking, should be the suggested videos. The server 205 can send the target video and the suggested videos to the client device 207. The client device 207 can provide the target video 213 and the suggested videos 215 in the GUI 211.

Ranking and providing suggested videos can be an iterative process. The number of iterations can depend on the number of requests received. For example, a user may select suggested video-3 217 as a new target video and the client device 207 may send a request for the new target video to the server 205. In response to the request, the server 205 may identify a set of candidate videos for the new target video and may execute the prediction model to determine the predicted user consumption times or the sub-tree consumption times and rank the candidates videos using the predicted user consumption times or the sub-tree consumption times. The server 205 may determine which candidate videos should be suggested videos and send the target video SV-3 and the suggested videos to the client device 207. The client device 207 may provide SV-3 as the new target video 223 and the new set of suggested videos 225 in the GUI 211.

The user may then select suggested video-20 227 as a new target video and the client device 207 may send a request for the new target video to the server 205. In response to the request, the server 205 may identify a set of candidate videos for the new target video and may determine the predicted user consumption times or the sub-tree consumption times, rank the candidates videos, determine the suggested videos, and send the target video SV-20 and the suggested videos to the client device 207. The client device 207 may provide SV-20 as the new target video 233 and the new set of suggested videos 235 in the GUI 211.

Figure 3:
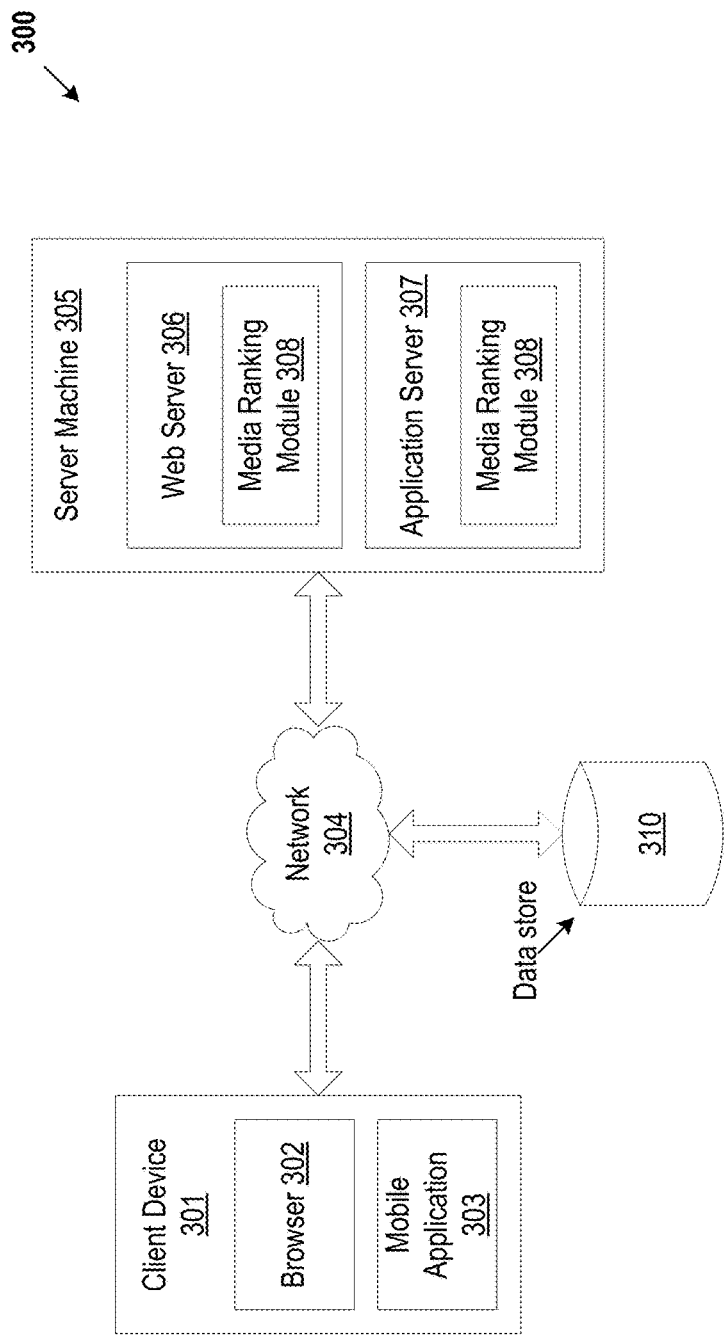
FIG. 3 illustrates exemplary system architecture, in accordance with various implementations of the present disclosure.

FIG. 3 illustrates exemplary system architecture 300 in which implementations can be implemented. The system architecture 300 can include any number of client devices 301, one or more server machines 305, and one or more data stores 310 coupled to each other over a network 304. Network 304 may be a public network (e.g., the Internet), a private network (e.g., a local area network (LAN) or wide area network (WAN)), or a combination thereof.

The data stores 310 can store media items, such as, and not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A data store 310 can be a persistent storage that is capable of storing data. As will be appreciated by those skilled in the art, in some implementations data store 310 might be a network-attached file server, while in other implementations data store 310 might be some other type of persistent storage such as an object-oriented database, a relational database, and so forth.

The client device 301 can be a portable computing device such as a cellular telephones, personal digital assistants (PDAs), portable media players, netbooks, laptop computers, an electronic book reader or a tablet computer (e.g., that includes a book reader application), and the like. The client device 301 can also be other types of computing devices such as a desktop computer, a set-top box, a gaming console, a television, etc. that may not traditionally be considered to be portable.

The client devices 301 can run an operating system (OS) that manages hardware and software of the client devices 301. A browser 302 can run on the client devices 301 (e.g., on the OS of the client devices). The browser 302 can be a web browser that can access content served by a web server 306 hosted by the server machine 305. Alternatively, a mobile application 303 can run on the client devices 301 (e.g., on the OS of the client devices). The mobile application 303 can be an application that can access content served by an application server 307 hosted by the server machine 305.

The server machine 305 can host a web server 306 and/or an application server 307 to provide web applications and/or mobile device applications and data for the applications. Server machine 305 can be a rackmount server, a router computer, a personal computer, a portable digital assistant, a mobile phone, a laptop computer, a tablet computer, a camera, a video camera, a netbook, a desktop computer, a media center, or any combination of the above.

The web server 306 and/or application server 307 can include a media ranking module 308 to rank candidate media items that correspond to a target media item to determine the suggested media items that should be sent to the client device 301 with the target media item. The media ranking module 308 can identify a target media item, for example, from a request, and determine a set of candidate media items that correspond to the target media item. The media ranking module 308 can identify features of the candidate media items. The media ranking module 308 can execute a model using the features of the candidate media items to determine the predicted user consumption time or the sub-tree consumption time for each of the candidate media items. The media ranking module 308 can use the predicted user consumption times or the sub-tree consumption times to rank the candidate media items and can select, for example, the top-ranking candidate media items as the suggested media items. The media ranking module 308 can retrieve the target media item and the suggested media items from the data store 310 and send the target media item and the suggested media items to the client device 301. The client device 301 can render the target media item and the suggested media items received from the server machine 305 in the browser 302 and/or mobile application 303 for the user. The browser 302 and/or mobile application 303 can include a graphical user interface that can include target media item and suggested media items.

Figure 4:
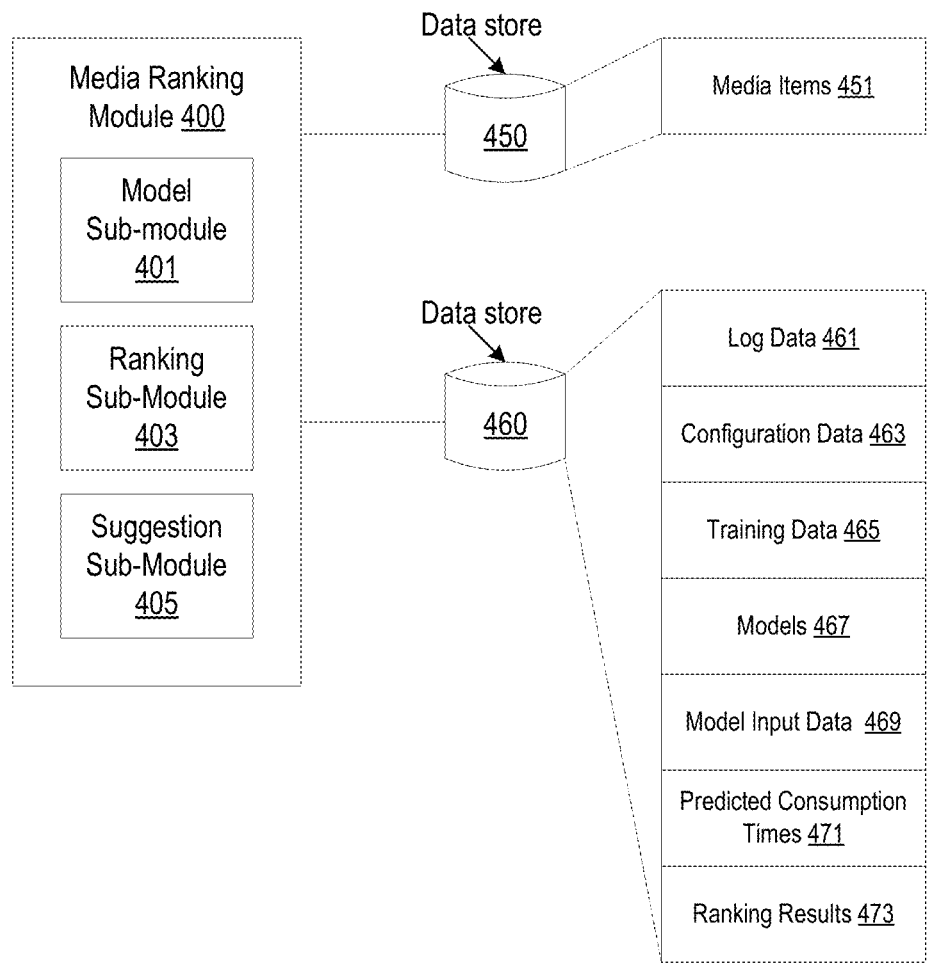
FIG. 4 is a block diagram of a ranking module, in accordance with various implementations.

FIG. 4 is a block diagram of a media ranking module 400, in accordance with one implementation of the present disclosure. The media ranking module 400 can include a model sub-module 401, a ranking sub-module 403, and a suggestion sub-module 405. Note that in alternative implementations, the functionality of one or more of the model sub-module 401, the ranking sub-module 403, and the suggestion sub-module 405 are combined or divided.

The media ranking module 400 can be coupled to one or more data stores 450 that store media items 451. Examples of media items 451 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A data store 450 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The media ranking module 400 can be coupled to one or more data stores 460 that store log data 461. The log data 461 can describe user activity in relation to the media items 451. The user activity can be for any number of users. The log data 461 can have one or more entries for each media item. For each entry, the log data 461 can include, for example, and not limited to, the identifier of the target media item that is associated with the candidate media item, the identifiers of the other suggested media items that are in the same set of suggestions as the candidate media item, a country identifier associated with the candidate media item, a gender associated with a user watching the candidate media item, an age associated with a user watching the candidate media item, etc. The user consumption time can include, and is not limited to, the time a video is playing, the time music is playing, the time an image is being displayed, the time a digital book is open, etc. The user consumption time and sub-tree consumption time can be measured for example, and not limited to, seconds, minutes, etc.

The model sub-module 401 can process the log data 461 to extract data from the log data 461 and format the data for use as training data 465 to create, train, and tune a model 467. There can be more than one model 467. For example, there may be a model that predicts user consumption time, which is the time a user may spend consuming a media item, and there may be another model that predicts sub-tree consumption time, which is a total of the user consumption time of a parent media and the user consumption time of each child media item. The models 467 can be stored in the data store 460.

The model sub-module 401 can extract data from the log data 461 for each instance a media item is consumed. The data that can be extracted, can include, and is not limited to, the identifier of the target media item that is associated with the media item, the identifiers of the other suggested media item that are in the same set of suggestions as the media item, a country identifier associated with the media item, a gender associated with a user consuming the media item, an age associated with a user consuming the media item, etc.

The model sub-module 401 can format the data for each instance of a media item being consumed for training data 465. For example, according to some implementations, the training data 465 is a comma-separate value (CSV) file, where each is row is an "example" consisting of a set of features and a "value." For example, FIG. 5 illustrates an example of a tree diagram 500 describing activity recorded in log data. Log data can include data for any number of users. Tree diagram 500 is exemplary data describing activity for one user. For example, a GUI on a client device includes a target video (TV1) and three suggested videos SV1, SV2, and SV3. Each of SV1, SV2, and SV3 can be processed as parent suggested videos because the identification of TV1 may not have been as a result of TV1 being a suggested video. For example, a user may have queried the application server for TV1.

The user may not have watched SV1 and the actual sub-tree consumption time for SV1 may be zero seconds. The user may have selected SV2 as a new target video and may have watched SV2 for 5 seconds. The user may not have watched any of the suggested videos (SV2.1, SV2.2, and SV2.3) for SV2. The actual sub-tree consumption time for SV2 may be 5 seconds. The user may have selected SV3 as a new target video and may have watched SV3 for 300 seconds. The model sub-module 401 can determine, for example, using an algorithm that SV3 is a parent suggested video and is not a child suggested video to SV2 even though the user watched SV2 first because SV3 and SV2 are part of the same set of suggested videos (SV1, SV2, and SV3). The suggested videos for SV3 may include SV3.1, SV3.2, and SV3.3. The user may have selected SV3.1 as a new target video and may have watched SV3.1 for 60 seconds. The user may not have watched any of the suggested videos (SV3.1.1, SV3.1.2, and SV3.1.3) for SV3.1. The user may not have watched SV3.2. The user may have selected SV3.3 as a new target video and may have watched SV3.3 for 90 seconds. The user may have selected SV3.3.1 as a new target video and may have watched SV3.3.1 for 180 seconds. The user may not have watched SV3.3.2 and SV3.3.3. The actual sub-tree consumption time for SV3 may be the sum of 300 second, 60 second, 90 seconds, and 180 seconds, which is a total of 630 seconds or 10.5 minutes.

FIG. 6 illustrates an example of a training data 600 based on log data (e.g., log data 500 in FIG. 5). The training data 600 may be formatted as a comma-separate value (CSV) file. The training data 600 can be a table, where each row is an "example" 603. Each media item instance in the log data can be used an example. For example, SV1, SV2, and SV3 are examples 603. Each example has a collection of numeric or text features 607 (columns) that describe the example 603. Each example 603 also has a single value 605 that is assigned to the example 603. The value can be a numeric value. The training table can have one value 605 column (e.g., the first column), and one or more feature columns. The training table can have any number of columns. The training table can have any number of examples (rows).

For example, the training data 600 is for a model that can be used to predict a consumption time or a sub-tree consumption time for a media item based on the target mediate media item associated with the media item, the suggested media items associated with the media item, and the user consumption time for each suggested media item. For example, the example value 605 may be the sub-tree consumption time. The training data 600 has three examples, each representing data for a video. Each example 603 has the following columns "target video identifier", "suggested video", "consumption time for suggested video," "suggested video", "consumption time for suggested video," etc. For instance, the example of SV1 has a sub-tree consumption time value of "0", the example of SV2 has a sub-tree consumption time value of "5", and the example of SV3 has a sub-tree consumption time value of "630".

The model can look for patterns in the examples 603. When the model is executed on a media item at run time, the model can use the features of the media item and the patterns in the training data to find the closest example to estimate a value (e.g., predicted user consumption time, predicted sub-tree consumption time) for the media item.

Returning to FIG. 4, the model sub-module 401 can format the data extracted from the log data 461 for use as training data 465. For example, the model sub-module 401 may format the extracted log data 461 into a comma-separate value (CSV) file, where each is row is an "example" consisting of a set of features and a "value." The model sub-module 401 can train a model 467 using the training data 465.

The training data 465 can be based on log data 461 that has been collected for an extended period of time. For example, the training data 465 can represent the log data for the past thirty days. The model sub-module 401 can process the log data 461 periodically and add the additional data to the training data 465 to tune the model 467. The period can be a configurable time defined by configuration data 463 stored in the data store 460. Examples of the period can include, and are not limited to once a day, once every number of hours, once during a specified event, at a specified time, etc. For example, the model 467 may initially predict a sub-tree consumption time for SV3 may be 630 seconds. As new training data is used to train the model 467, the model 467 may be adjusted by having more examples and may predict that the sub-tree consumption time for SV3 may be 640 seconds.

At run time, for example, when the media ranking module 400 receives a request for a target media item, the model sub-module 401 can identify a set of candidate media items that correspond to the target media item, and run the model 467 on the candidate media items. A candidate media item is a media item (e.g., video) that may be selected as a suggested media item for a user, according to various implementations. In one implementation, the model sub-module 401 receives data indicating the candidate media items that correspond to the requested target media item and including the features for each candidate media item. In one implementation, the media ranking module 400 collects features for a user. For example, the media ranking module 400 can request a user to optionally provide user information (e.g., age, gender, country, etc.), receive the user information, and store the user information in the data store 460. In one implementation, a client device notifies users of the types of information that are stored in the respective logs and data stores and transmitted to the server, and provides the user the opportunity to choose not to have such information collected and/or shared with the server. In another implementation, the media ranking module 400 receives the data from another server computer system. For example, the model sub-module 401 may receive a CSV file containing the candidate media identifiers that and the corresponding features for each candidate media identifier from another server computer system. The candidate media identifiers that and the corresponding features for each candidate media identifier can be stored as model input data 469 in the data store 460. The model sub-module 401 can run the model 467 on each candidate media item using the features of the candidate media item to determine the predicted user consumption time or sub-tree consumption time for each candidate media item. The model sub-module 401 can store the predicted consumption times 471 (e.g. user consumption times, sub-tree consumption times) in the data store 460.

The ranking sub-module 403 can use the predicted consumption times 471 to rank the candidate media items. In some implementations, the ranking sub-module 403 ranks the candidate media items from the greatest predicted consumption time 471 to the least. The ranking results 473 can be stored in the data store 460.

The suggestion sub-module 405 can use the configuration data 463 to select a sub-set of the candidate media items as suggested media items. The configuration data 463 can specify the number of candidate media items to select. For example, the configuration data 463 may specify that twenty candidate media items should be selected as suggested media items. The suggestion sub-module 405 can select the top twenty candidate media items using the ranking results 471. The suggestion sub-module 405 can send the requested media item (target media item) the suggested media items that correspond to the target media item to a client device.

Figure 7:
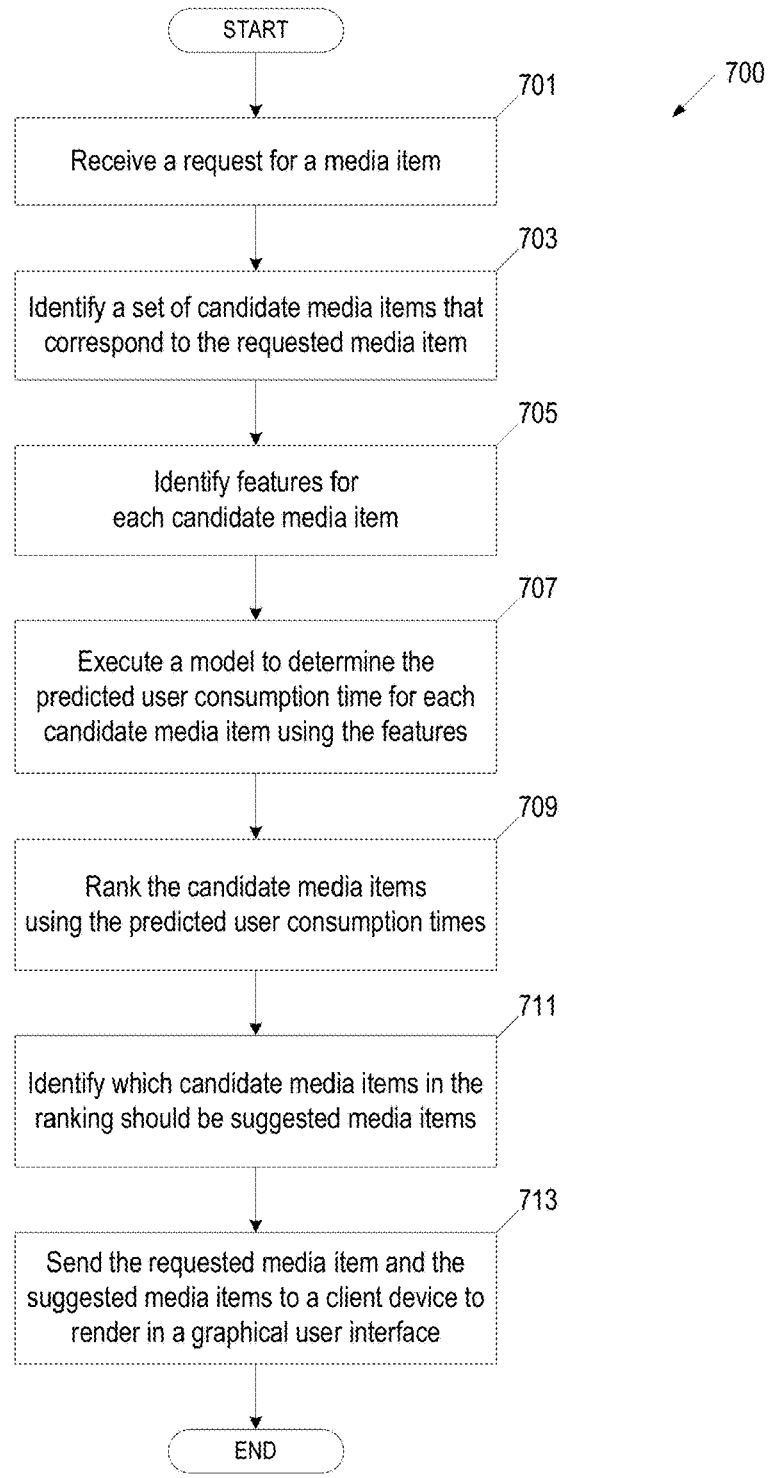
FIG. 7 is a flow diagram of an implementation of a method for ranking media items using predicted user consumption time.

FIG. 7 is flow diagram of an implementation of a method for providing suggested media items using user consumption time. The method may be performed by processing logic that may comprise hardware (circuitry, dedicated logic, etc.), software (such as is run on a general purpose computer system or a dedicated machine), or a combination of both. In one implementation, the method of FIG. 7 may be performed by the media ranking module 308 hosted by server machine 305 of FIG. 3.

For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 701, processing logic receives a request for a particular media item. The request can be from a client device. For example, a user selects a video to watch using a browser or a mobile application on the client device, and the browser or a mobile application sends the request. The request can include an identifier of the media item. At block 703, processing logic identifies a set of candidate media items that correspond to the requested media item. The candidate media items are media items that may be selected as suggested media items for the requested media item. In one implementation, processing logic provides the requested media item identifier to another system and the system provides processing logic with data indicating the candidate media items that correspond to the requested target media item and including the features for each candidate media item. At block 705, processing logic identifies features for each candidate media item. In one implementation, processing logic receives the features from another system. In one implementation, processing collects features for a user. In one implementation, a client device notifies users of the types of information that are stored in the respective logs and data stores and transmitted to the server, and provides the user the opportunity to choose not to have such information collected and/or shared with the server.

For example, processing logic may receive a CSV file containing the candidate media identifiers and the corresponding features for each candidate media identifier. Examples of features can include, and are not limited to, the identifier of the target video that is associated with the candidate video, the identifiers of the other suggested videos that are in the same set of suggestions as the candidate video, the user consumption time of the other suggested videos, a country identifier associated with the candidate video, a gender associated with a user watching the candidate video, an age associated with a user watching the candidate video, etc.

At block 707, processing logic executes a model that is stored in the data store in response to the request to determine a predicted user consumption time the users may spend consuming each candidate media item. In various implementations, processing logic executes a model that is stored in the data store in response to the request to determine a predicted sub-tree consumption time the users may spend consuming each parent candidate media item and child media items for the parent candidate media item.

Processing logic can execute the model using the features of each candidate media item as input to determine the predicted user consumption times or the predicted sub-tree consumption times. In another implementation, processing logic determines, for each candidate media item, a percentage of the candidate media item that is consumed by each user, identifies which candidate media items satisfy a percentage threshold, and determines, for each candidate media item that satisfies the percentage threshold, the predicted user consumption time or the predicted sub-tree consumption time for each the candidate media item. The percentage threshold may be stored as configuration data in the data store.

For example, the features for candidate videos may include a percentage of the length of the corresponding candidate video that has been consumed by a user. Processing logic may determine which candidate videos have been consumed by users that have consumed at least 80% (percentage threshold) of the length of the candidate video. For each of the candidate videos that have users that have consumed at least 80% of the length of the candidate video, processing logic may use the model to determine the predicted user consumption time or the predicted sub-tree consumption time. In one implementation, processing logic determines an average percentage for each candidate media item. Processing logic can store the predicted user consumption times and/or the predicted sub-tree consumption times in the data store.

At block 709, processing logic ranks the candidate media items using the predicted user consumption times or the predicted sub-tree consumption times. The predicted user consumption times or the predicted sub-tree consumption times may be one feature that is used to rank the candidate media items. For example, processing logic may determine the rank of the candidate media item using the predicted user consumption time or the predicted sub-tree consumption times and any combination of other features, such as, and not limited to, a geographical identifier that may be associated with the candidate media item, a gender that may be associated with the candidate media item, an age range that may be associated with the candidate media item, etc.

At block 711, processing logic identifies which candidate media items in the ranking should be suggested media items for the request. Processing logic can use configuration data that is stored in the data store to select a sub-set of the candidate media items as the suggested media items. For example, the configuration data may specify that the twenty candidate media items having the greatest amount of predicted user consumption time should be suggested media items. For example, processing logic selects the top twenty videos in the ranking. At block 713, processing logic sends the requested media item and the suggested media items that correspond to the requested media item to the client device.

The browser or mobile application on the client device can render the requested media item and the suggested media items in a graphical user interface.

Figure 8:
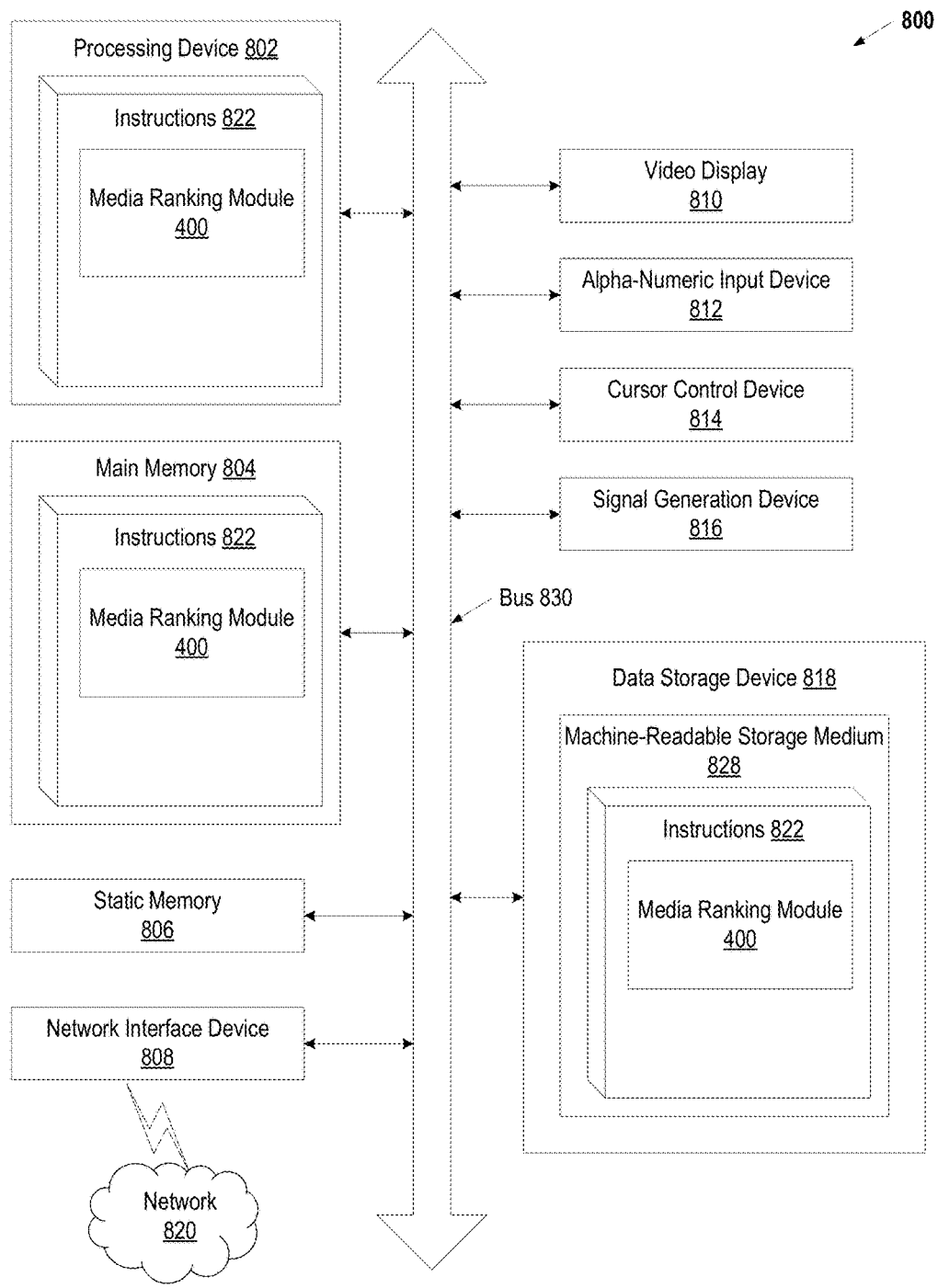
FIG. 8 is a block diagram of an exemplary computer system that may perform one or more of the operations described herein, in accordance with various implementations.

FIG. 8 illustrates a diagram of a machine in the exemplary form of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions 822 (e.g., software) embodying any one or more of the methodologies or functions described herein. The instructions 822 may also reside, completely or at least partially, within the main memory 804 and/or within the processor 802 during execution thereof by the computer system 800, the main memory 804 and the processor 802 also constituting computer-readable storage media. The instructions 822 may further be transmitted or received over a network 820 via the network interface device 808.

In one implementation, the instructions 822 include instructions for media ranking module (e.g., media ranking module 400 of FIG. 4) and/or a software library containing methods that call the media ranking module. While the computer-readable storage medium 828 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "predicting", "selecting", "providing", "executing," "ranking," "determining," "creating," "recording," "adjusting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

FIG. 6 illustrates an example of a training data 600 based on log data (e.g., log data 500 in FIG. 5). The training data 600 may be formatted as a comma-separate value (CSV) file. The training data 600 can be a table, where each row is an "example" 603. Each media item instance in the log data can be used an example. For example, SV1, SV2, and SV3 are examples 603. Each example has a collection of numeric or text features 607 (columns) that describe the example 603. Each example 603 also has a single value 605 that is assigned to the example 603. The value can be a numeric value. The training table can have one value 605 column (e.g., the first column), and one or more feature columns. The training table can have any number of columns. The training table can have any number of examples (rows).

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    presenting a list of one or more videos via a user interface;
    receiving a selection of a target video to watch from the list;
    playing the target video in the user interface; and
    updating the user interface to present one or more suggested videos concurrently with playback of the target video, wherein the one or more suggested videos are predicted to be watched by a user for at least a threshold duration based on user consumption times of a first plurality of videos selected by a user and user consumption times of a second plurality of videos suggested to the user in association with respective videos from the first plurality of videos.

2. The method of claim 1, further comprising:
    receiving a selection of one of the one or more suggested videos as a new target video to watch;
    playing the new target video in the user interface; and
    updating the user interface to present one or more additional suggested videos concurrently with playback of the new target video, wherein the one or more additional suggested videos are predicted to be watched by the user for at least the threshold duration.

3. The method of claim 1, wherein the one or more suggested videos are selected from a plurality of candidate videos that correspond to the target video.

4. The method of claim 3, wherein-the one or more suggested videos are predicted to be watched by the user for at least the threshold duration responsive to application of a prediction model to features of the plurality of candidate videos, wherein the prediction model is configured to predict a length of time each candidate video is to be watched by the user, and the one or more suggested videos are selected as a subset of the plurality of candidate videos with predicted lengths of time that satisfy the threshold duration.

5. The method of claim 4, wherein predicting the length of time each candidate video is to be watched by the user further comprises:
    identifying, for each candidate video, other videos that are suggested in association with the corresponding candidate video, wherein the other suggested candidate videos are child candidate videos and the corresponding candidate video is a parent candidate video; and
    predicting a sub-tree length of time that each candidate video is to be watched by the user, wherein the sub-tree length of time comprises a total of the length of time for the parent candidate video and the length of time of each child candidate video.

6. The method of claim 4, wherein, for each candidate video of the plurality of candidate videos, the features comprise at least one of an identifier of the target video corresponding to the candidate video, an identifier of each suggested video of the one or more suggested videos that is in a same set of suggestions as the candidate video, a length of time the other candidate videos are watched, a country identifier, a gender of a user associated with the candidate video, or an age of the user associated with the candidate video.

7. The method of claim 4, wherein the subset comprises a predefined number of top ranking candidate videos.

8. The method of claim 4, wherein predicting the length of time each candidate video is to be watched by the user further comprises:
    determining, for each candidate video, a percentage of the candidate video that is to be consumed by the user;
    determining which candidate videos satisfy a percentage threshold; and
    predicting the length of time for each candidate video that satisfies the percentage threshold.

9. The method of claim 8, wherein identifying which candidate videos satisfy the percentage threshold further comprises:
    determining, for each candidate video, an average percentage of the candidate video that is to be consumed by the user; and
    identifying candidate videos comprising an average percentage that satisfies the percentage threshold.

10. A system comprising:
    a memory; and
    a processing device coupled to the memory to:
        present a list of one or more videos via a user interface;
        receive a selection of a target video to watch from the list;
        play the target video in the user interface; and
        update the user interface to present one or more suggested videos concurrently with playback of the target video, wherein the one or more suggested videos are predicted to be watched by a user for at least a threshold duration based on user consumption times of a first plurality of videos selected by a user and user consumption times of a second plurality of videos suggested to the user in association with respective videos from the first plurality of videos.

11. The system of claim 10, wherein the processing device further to:
- receive a selection of one of the one or more suggested videos as a new target video to watch;
- play the new target video in the user interface; and
- update the user interface to present one or more additional suggested videos concurrently with playback of the new target video, wherein the one or more additional suggested videos are predicted to be watched by the user for at least the threshold duration.

12. The system of claim 10, wherein the one or more suggested videos are selected from a plurality of candidate videos that correspond to the target video.

13. The system of claim 10, wherein the one or more suggested videos are predicted to be watched by the user for at least the threshold duration responsive to application of a prediction model to features of the plurality of candidate videos, wherein the prediction model is configured to predict a length of time each candidate video is to be watched by the user, and the one or more suggested videos are selected as a subset of the plurality of candidate videos with predicted lengths of time that satisfy the threshold duration.

14. The system of claim 13, wherein to predict the length of time each candidate video is to be watched by the user, a server further to:
- identify, for each candidate video, other videos that are suggested in association with the corresponding candidate video, wherein the other suggested candidate videos are child candidate videos and the corresponding candidate video is a parent candidate video; and
- predict a sub-tree length of time that each candidate video is to be watched by the user, wherein the sub-tree length of time comprises a total of the length of time for the parent candidate video and the length of time of each child candidate video.

15. The system of claim 13, wherein, for each candidate video of the plurality of candidate videos, the features comprise at least one of an identifier of the target video corresponding to the candidate video, an identifier of each suggested video of the one or more suggested videos that is in a same set of suggestions as the candidate video, a length of time the other candidate videos are watched, a country identifier, a gender of a user associated with the candidate video, or an age of the user associated with the candidate video.

16. The system of claim 13, wherein the subset comprises a predefined number of top ranking candidate videos.

17. A non-transitory, computer readable medium storing instructions that, when executed by a processing device, cause the processing device to:
- present a list of one or more videos via a user interface;
- receive a selection of a target video to watch from the list;
- play the target video in the user interface; and
- update the user interface to present one or more suggested videos concurrently with playback of the target video, wherein the one or more suggested videos are predicted to be watched by a user for at least a threshold duration based on user consumption times of a first plurality of videos selected by a user and user consumption times of a second plurality of videos suggested to the user in association with respective videos from the first plurality of videos.

18. The computer readable medium of claim 17, wherein the processing device further to:
- receive a selection of one of the one or more suggested videos as a new target video to watch;
- play the new target video in the user interface; and
- update the user interface to present one or more additional suggested videos concurrently with playback of the new target video, wherein the one or more additional suggested videos are predicted to be watched by the user for at least the threshold duration.

19. The computer-readable medium of claim 17, wherein the one or more suggested videos are selected from a plurality of candidate videos that correspond to the target video.

20. The computer-readable medium of claim 19, wherein the one or more suggested videos are predicted to be watched by the user for at least the threshold duration responsive to application of a prediction model to features of the plurality of candidate videos, wherein the prediction model is configured to predict a length of time each candidate video is to be watched by the user, and the one or more suggested videos are selected as a subset of the plurality of candidate videos with predicted lengths of time that satisfy the threshold duration.

* * * * *